No. 749,937.

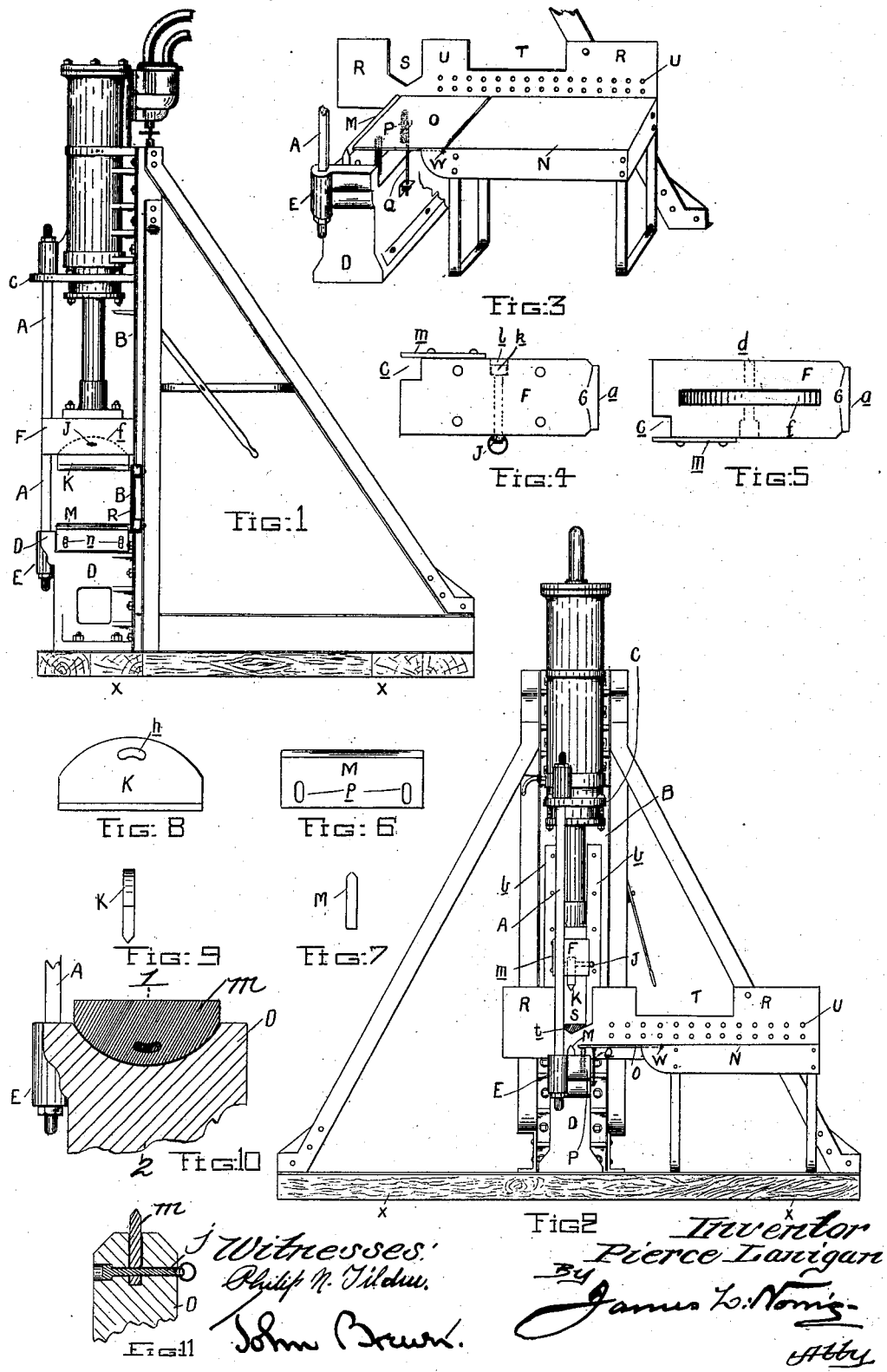

Patented January 19, 1904.

UNITED STATES PATENT OFFICE.

PIERCE LANIGAN, OF GREY LYNN, NEW ZEALAND.

MACHINE FOR CUTTING AND SHAPING STONE.

SPECIFICATION forming part of Letters Patent No. 749,937, dated January 19, 1904.

Application filed November 3, 1902. Serial No. 130,003. (No model.)

*To all whom it may concern:*

Be it known that I, PIERCE LANIGAN, contractor, a subject of His Majesty the King of the United Kingdom of Great Britain and Ireland, residing at Grey Lynn, in the provincial district of Auckland and Colony of New Zealand, have invented a certain new and useful Machine for Cutting and Shaping Stone, of which the following is a specification.

This machine is intended to cut and shape more or less hard stone, so as to fit it for building purposes, for curbing, tram-lines, or whatever use it can be put to.

The machine consists in having guides built to the under and upper blocks, the upper block carrying a cutting-knife, chisel, or the like with its sharpened edge pointing downward, and said knife, chisel, or the like being adjusted to work up and down in and on guides; an under block secured to the under carriage and carrying a cutting-knife, chisel, or the like with its sharpened edge pointing upward; a table for holding stone in such manner that it may be projected over the under knife and beneath the upper knife; compression-springs and a rod beneath the movable part of table to minimize concussion; a perforated side plate attached to the table; and stays for holding the machine in position.

Referring to the accompanying drawings, Figure 1 is a side elevation of the machine with steam-hammer attachment and showing one of the stays. Fig. 2 is a front elevation of the machine with steam-hammer attachment and showing two of the stays. Fig. 3 is a perspective view of the lower-knife-holding block and the table for holding the stone while being operated upon. Fig. 4 is a plan of the upper block, showing ends shaped to engage the guides and showing screw-bolt therein for securing the upper knife thereto. Fig. 5 is an inverted plan of the upper block, showing its ends shaped to engage the guides and showing the screw-bolt hole and groove for the upper knife to fit into. Fig. 6 is a vertical elevation of under knife as shown in Fig. 1. Fig. 7 is an end elevation of under knife as shown in Fig. 2. Fig. 8 is a vertical elevation of upper knife as shown in Fig. 1. Fig. 9 is an end elevation of upper knife as shown in Fig. 2. Fig. 10 is a detail sectional view showing the manner in which the knife M is mounted in the block D according to a modified construction. Fig. 11 is a cross-section on the line 1 2 of Fig. 10.

The outer guide A is secured and held to the H-iron frame B at its upper end by the horizontal piece C and to the under block D by the projection E. The upper block F has its inner corners G cut so as to leave a shallow projection $a$, which fits in and works between guide-pieces $b$ in the H-iron frame B, and one corner $c$ of the outer end of said block F is shaped to fit onto the outer guide A. A hole $d$ is also provided in the upper block F for the screw-bolt J to screw into, and a groove $f$ is made in its under part, rising inwardly to about half its height and shaped, as shown by the dotted lines in Fig. 1, to receive and hold the upper knife K, which is shaped, as in Fig. 8, so that it will turn in the groove $f$. A curved slot $h$ is made in the upper knife K for the screw-bolt J to pass through when screwed into the hole $d$. The screw-bolt J when screwed through the hole $d$ and slot $h$ is tightened up by a nut $k$ in the recess $l$. A plate $m$ is bolted or screwed to the upper block F outside the corner $c$ to keep it in position on the outer guide A. A cushioned buffer $t$, Fig. 2, is placed between guide-pieces $b$ and rests on lower block D to stop the further descent of upper block F and knife K after cutting or shaping the stone. The upper block F is suitably secured to whatever form of power is used to operate it. In Figs. 1 and 2 a steam-hammer is shown, as that will in all probability be found to be the most suitable for the work to be done; but this application is neither limited to this form of power, nor is it claimed, for any other form of power that will operate the block F and its knife K may be employed. In Figs. 1 and 2 the upper block F is shown fitted to the foot of the piston-rod and the under part of the cylinder passed through the horizontal piece C. The slot $h$ is curved, so that the knife K can be adjusted to any angle that the curve will admit of and the shape of the stone being treated requires.

The under knife M is adjusted to the under block D with its sharpened edge projecting upward in a direct line with the sharpened edge of the upper knife K by screw-bolts n, as shown in Fig. 1, and vertical slots p are provided in the knife M, so that it can be raised, lowered, or canted on one side to suit the stone by unscrewing the bolts n and screwing them up again, as may be required. If desired, the under knife may be shaped the same as the upper knife K, being the same inverted with the sharpened edge projecting up instead of down and slotted and attached to the under block D with screw-bolt J, as is done with the upper block F if the class of stone being treated can be worked better by such a change.

A table is provided to carry the stone being cut and shaped. The outer end N of this table is stationary, while the inner end O is loosely fitted close up to the under knife M, so that it will yield or give to the blow of the upper knife K on the stone and with the help of the compression-springs P below it minimize the concussion. A rod Q is placed beneath and secured to the under part of the inner end O, with its lower end so adjusted to the under block D that it will steady the inner end of table O and check its rebound after the blow on the stone. A flat piece R, perforated and cut in parts, as shown in Fig. 3, is fitted to the side of the table for the purpose of keeping the stone in position. The part is cut out at S to make room for the upper block F and knife K in the downward stroke. The other part cut out at T is, with the perforations U, to give facilities for moving the stone. The fixed or stationary end N of the table is held by any suitable form of stand, and the inner end O is kept in position by the springs P, rod Q, and part turned under rod at W, forming a hinge. The whole machine is suitably secured to solid foundations X.

When the machine is being worked, the upper and under knives are set at angles suitable to the configuration of the stone being operated upon, but with their sharpened edges in the same line and directly over and under each other. The stone is then placed on the table with the part to be cut off or shaped projecting over or resting on the under knife, and the upper knife is made to strike the stone and cut and shape it as wanted.

As before stated, no claim is made for the steam-hammer shown in Figs. 1 and 2. It is only given to illustrate the form of power that will probably be found to be the most suitable. Any other form of power that will operate the machine so as to effectively cut and shape the stone may be applied to it.

All parts of the machine can be made of such metal or material as will make it most effective.

Having fully described my invention, what I desire to claim and secure by Letters Patent is—

1. In a machine for cutting and shaping stone, a lower block having a groove therein, a knife, having elongated slots therein, seated in the groove of said lower block, adjusting-bolts passing through said lower block and through the slots in said knife, an upper block having a groove therein, a knife, having a curved slot therein, seated in the groove of said upper block, an adjusting-bolt passing through said upper block and through the curved slot in said knife, means for operating said upper block, and a table located adjacent to said lower block.

2. In a machine for cutting and shaping stone, a lower block having a groove therein, a knife, having elongated slots therein, seated in the groove of said lower block, adjusting-bolts passing through said lower block and through the slots in said knife, an upper block having a groove therein, a knife, having a curved slot therein, seated in the groove of said upper block, an adjusting-bolt passing through said upper block and through the curved slot in said knife, means for operating said upper block, a stationary table, a hinged member attached to said table adjacent to said lower block, cushion-springs connected to said hinged member, and a rod for controlling the rebound of said hinged member.

3. In a machine for cutting and shaping stone, a lower block having a groove therein, a knife having an elongated slot therein, seated in the groove of said lower block, an adjusting-bolt passing through said lower block and through the slot in said knife, an upper block having a groove therein, a knife having a slot therein, seated in the groove in said upper block, an adjusting-bolt passing through said upper block and through the slot in said knife, means for operating said upper block, and a table adjacent to said lower block.

PIERCE LANIGAN.

Witnesses:
  GEORGE WILLIAM BARLEY,
  MARJORY MOURO.